United States Patent

Wilke et al.

[11] Patent Number: 5,843,513
[45] Date of Patent: Dec. 1, 1998

[54] METHOD AND APPARATUS FOR INJECTING DRY SOLIDS PARTICULATES INTO A FLOW OF GROUND MEAT

[75] Inventors: Daniel B. Wilke, Waunakee; Ralph H. Bethke; Bonnie M. Hinze, both of Sun Prairie, all of Wis.

[73] Assignee: Kraft Foods, Inc., Northfield, Ill.

[21] Appl. No.: 778,181

[22] Filed: Jan. 2, 1997

[51] Int. Cl.⁶ .............................. A23L 1/00; G01F 11/00
[52] U.S. Cl. .......................... 426/646; 99/494; 222/409; 426/289
[58] Field of Search .................... 426/646, 417, 426/289; 99/494; 425/562, 586; 118/23; 222/409

[56] References Cited

U.S. PATENT DOCUMENTS

| | | | |
|---|---|---|---|
| 2,377,069 | 5/1945 | Brubaker | 99/494 |
| 3,039,145 | 6/1962 | Langecker | 222/409 |
| 3,335,461 | 8/1967 | Schwartz | 222/409 |
| 4,112,545 | 9/1978 | Covington et al. | 426/646 |
| 4,454,804 | 6/1984 | McCulloch | 99/494 |
| 4,676,279 | 6/1987 | Von Lersner | 222/148 |
| 5,382,444 | 1/1995 | Roehrig et al. | 426/646 |
| 5,643,361 | 7/1997 | Wadell | 99/494 |

Primary Examiner—George Yeung
Attorney, Agent, or Firm—Lockwood, Alex, FitzGibbon & Cummings

[57] ABSTRACT

An apparatus for preparing reduced-fat meat by injecting dry solids such as phosphate powder into a flow of meat supply, includes a passageway for passing the meat therethrough, a ram chamber having a feed ram such that the feed ram is capable of being positioned in any one of a feed position and a fill position, the ram chamber having a particulate opening for entry of dry solids into the ram chamber, and a feed port providing a path for the feeding of the dry solids into the passageway. A control gate is placed generally along the passageway wherein it is capable of opening and closing the feed port. A control assembly is used for controlling the positional movement of the feed ram and the control gate such that the dry solids enter into the ram chamber through the particulate opening as the feed ram travels toward its fill position when the control gate is closed, and such that the control assembly directs the feed ram toward the feed port, blocking the particulate opening, and directs the control gate to the open position, thereby opening the feed port such that the dry solids are injected into the flow of meat supply through the feed port as the feed ram travels toward the feed position.

21 Claims, 2 Drawing Sheets

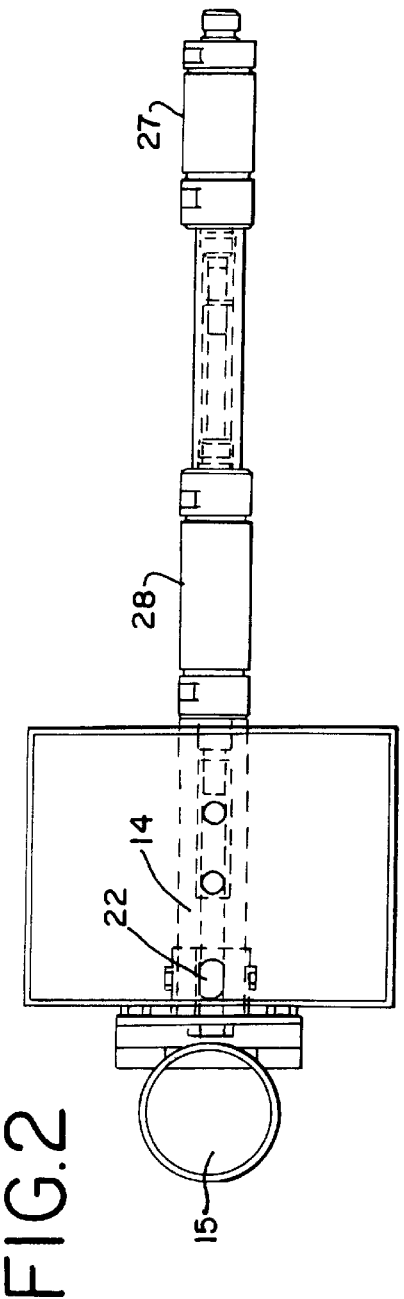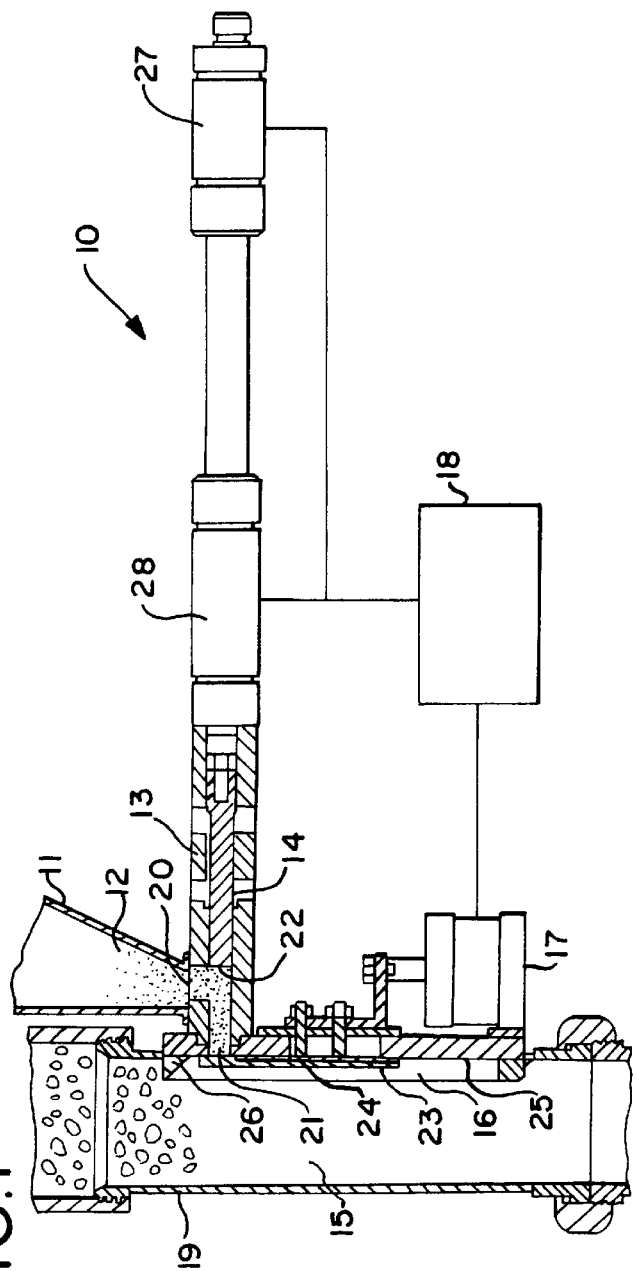

METHOD AND APPARATUS FOR INJECTING DRY SOLIDS PARTICULATES INTO A FLOW OF GROUND MEAT

FIELD OF THE INVENTION

This invention generally relates to the injection of dry particulate solids into a flow of moist and highly viscous material under pressure. More particularly, the invention relates to a method and an apparatus for injecting dry, solid food treatment particulates into a flow of food material such as ground meat. The invention is especially suitable for adding particulates into a generally constant flow of meat so as to blend with the meat prior to a subsequent separation treatment in order to reduce the fat content of meat.

The illustrated specific embodiment of the present invention generally relates to processing of raw meat into a very low-fat meat having excellent functionality, as well as to meat products of the fat-free variety. More particularly, high-fat raw meat materials are transformed into a low-fat or so-called no-fat meat product which is highly functional, being suitable for use in a finished product and which has the ability to be molded, extruded and/or stuffed into a shape to provide finished food products which can be cooked, cured or otherwise processed as desired. Included is the precise and consistent injection of phosphate particulate material or the like into a comminuted meat flow which then passes into a centrifuge or other device which separates virtually all of the fat content from the thus treated meat source.

BACKGROUND OF THE INVENTION

The level of fat included in diets is of concern in many channels, particularly with respect to meat products or foods which contain animal-originating meat components. Meat food products are available which fall into the generally low-fat category. In the past, it has been considered to be satisfactory if the fat content of an uncooked raw meat supply is within a general magnitude on the order of about 10 weight percent or even 5 weight percent. While fat percentages of this general magnitude for raw meat materials represent a substantial step toward reducing the intake of fat for those who consume products made from this reduced-fat raw material, it would be beneficial to provide a highly functional fat-reduced meat raw material having a much lower fat content.

Awareness of fat intake has led consumers to value highly those food sources which are relatively low in fat or have virtually no fat content. Traditionally, many meat products have been perceived by certain groups as being products that are relatively high in fat content. Various techniques have made available meat products having fat percentages of 5% or less, such as at the 1% to 4% by weight level of fat in the meat product. Examples are turkey breast products which can achieve fat levels at the lower values of these ranges.

Consumer perception has developed along these lines to the extent that there is a desire to have even these relatively low fat percentages reduced further, ideally to arrive at a fat-free condition or a nominally fat-free condition. For example, current guidelines which are followed by the USDA permit many packaged meat products to be labeled as "fat-free" provided the amount of fat in the packaged slice meat or sausage product is less than 0.5 gram of fat per 55 grams, which is less than 0.91% by weight of the total packaged meat product. Such a product is thus properly designated as "free" of fat, and nutritional labelling properly specifies a zero ("0") as the reported fat content. Accordingly, there is an important need for meat products having a fat content which meets these zero, or nominal zero levels.

At times, raw meat materials having lowered fat contents are made available by procedures which include specially trimming raw meat cuts. These lower fat meat materials are relatively expensive and often are not readily available in volumes which would be suitable for extended use in mass-produced foods. In addition, such products can be highly labor-intensive. Certain fat-free meat products which meet governmental guidelines as discussed above have been commercialized on a production-scale basis. Typically, these are fat-free turkey and chicken whole muscle (often breast) products. Other fat-free products have been formulated from traditionally higher fat content sources. Such products can include reformulation in order to reduce fat levels by the inclusion of non-meat components which generally dilute the fat present in the meat which is included within the batter, grind or emulsion from which such a product is formed. It is often the case that these types of fat-free products, when subjected to taste tests, score significantly lower than corresponding products which are not of the fat-free variety.

Certain approaches in the past have been proposed for processing a high-fat meat supply into one that is of reduced fat content. Often, these types of procedures include cooking, grinding and centrifuging as a basic approach for separating a fat-rich phase from another phase having a lower fat content. The phase having a lower fat content typically contains lean fractions which had become denatured during processing, and the functionality of this phase often is reduced substantially, rendering it unsuitable and/or undesirable for use in many applications. Also, approaches such as these often do not provide a functional, reduced fat meat having a fat percentage on the order of the low-fat or no-fat products which are the subject of the present invention.

The present invention addresses the need for reduced fat meat which has an exceptionally low fat content so as to qualify as having a zero reported fat content, even including pork, while at the same time not being denatured to any significant extent in order to thereby provide a highly functional meat product which is exceptionally low in fat content. It is especially desirable that a fat-reduced raw meat material be provided which makes possible the preparation of finished meat products or meat-containing products such as patties, sausages, wieners, luncheon meats and formed meat products. Substantial progress along these lines has been made by approaches such as that of U.S. Pat. No. 5,382,444, which is incorporated by reference hereinto. By following this approach, it has been possible to provide valuable undenatured and very low-fat meat products. However, when it comes to certain meat sources, such as pork, it has not been possible heretofore to consistently achieve a fat content for meats such as pork which is low enough to meet the objectives of the present invention.

It has been proposed that dry solids powder such as phosphate powder can be added to these types of meat supplies to facilitate the separation of fat from the muscle. In order to efficiently achieve this fat separation result, it is important that the phosphate powder be mixed with the flowing meat supply without experiencing undesirable back flow. For example, with reference to the type of system shown in the 5,382,444 patent, it has been proposed to position a dry solids (phosphate powder) injector along the enclosed flow path of the meat supply being so processed. Exemplary injector locations can be upstream of a temperature adjustment station. The shortcoming of this proposal is that dry solids injectors heretofore available for injecting phosphate into the meat flow are adversely affected by the high pressure in the meat flow stream. The high pressure of the meat flow stream results in a back pressure in the dry solids injector and the eventual malfunctioning of the injector. Therefore, the proposed processes do not yield an optimized fat-reduced meat product or provide a reliable dry solids injector for the injection of the phosphate powder into the meat flow.

The present invention addresses the need for a more effective and enhanced mixture of a dry solids material such as the phosphate powder with a flowing meat supply. This enhanced mixture is achieved by injecting the meat product with the phosphate powder through an improved dry solids injector without the adverse effects of back-pressure on the dry solids injector. Typical back-pressures which can be encountered range between about 15 psi and about 60 psi, often at least about 40 psi. The invention can overcome pressures of these magnitudes, and even higher pressures as they might be encountered within particular systems.

SUMMARY OF THE INVENTION

The present invention is one of meat fat removal enhancement. A low-fat or no-fat meat raw material is prepared from meat supplies having a substantial fat content, which is typically in excess of 20 weight percent, based upon the total weight of the meat supply which also includes protein and moisture. This raw meat material is processed so as to provide the reduced fat meat raw material which has a fat content equal to or less than about 3.5% fat, or equal to or less than about 1.5% fat when needed, even for pork from which it is especially difficult to remove bound fat below the 1.5 weight percent level. Furthermore, this enhanced fat-reduced meat retains the functionality of the raw material meat supply. In the preferred process, a phosphate source is injected into comminuted raw meat trimmings using a solids injector apparatus. This apparatus forcibly introduces the phosphate source into the continuously flowing meat stream. This invention is also useful for injecting a phosphate source as an antioxidant in processing meats, especially poultry such as turkey where fat reduction is not necessarily a requirement or a primary objective.

It is a general object of this invention to provide an apparatus and method for injecting dry solid particulate material into a flowing stream of highly viscous and/or dense flowable material.

It is an object of the present invention to provide an improvement to an apparatus for enhancing the reduction of the fat content of meat products.

Another object of the present invention is to provide low fat meat through the injection of dry solids therein.

It is further an object of the present invention to provide an apparatus for injection of dry solids into a continuously flowing meat stream.

It is also a further object of the present invention to provide an apparatus and method for producing an enhanced mixture of dry solids with the meat products.

In accordance with these and other objectives, the present invention provides an apparatus for treating food products comprising: a passageway for passing a food product flow therethrough; a ram chamber having a feed ram therein, wherein the feed ram is capable of being positioned in any one of a feed position and a fill position, the feed ram having a feed end; the ram chamber having a particulate opening for entry of food treatment particulates into the ram chamber, and a feed port providing a path for the feeding of the food treatment particulates into the passageway; a control gate placed generally along said passageway, wherein the control gate is capable of being positioned in any one of an open position and a closed position, the open position opening the feed port and the closed position closing the feed port; and a control assembly for controlling the positional movement of the feed ram and of the control gate such that the food treatment particulates enter into the ram chamber through the particulate opening as the feed ram travels toward its fill position and when the control gate is at its closed position, and such that the control assembly directs the feed ram toward the feed port, blocking the particulate opening, and directs the control gate to its open position, thereby opening the feed port such that the food treatment particulates are injected into the food product flow through the feed port as the feed ram travels toward the feed position.

BRIEF DESCRIPTION OF THE DRAWINGS

In the course of this description, reference will be made to the attached drawings, wherein:

FIG. 1 is a cross-sectional view of a preferred embodiment of the apparatus of the present invention, wherein dry solids powder enters into a ram chamber for injection into meat flow with the feed ram being shown in its fully retracted fill position;

FIG. 2 is a top plan view of the apparatus illustrated in FIG. 1;

DETAILED DESCRIPTION OF THE INVENTION

Figure 3:
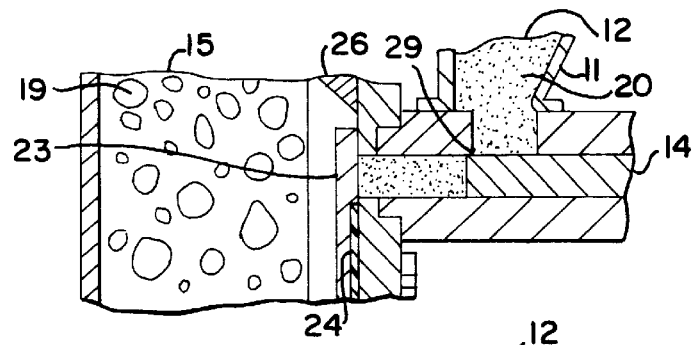
FIG. 3 is a cross-sectional, detailed view of the apparatus of FIG. 1, wherein the control gate is in its closed position with the feed ram blocking the entrance to the hopper.

The fat-containing raw materials which are transformed into the low-fat or no-fat raw meat in accordance with the present invention typically are trimmings from meat processing operations. These trimmings, typically collected by cutting away visible fat from the muscle, are high in fat content. Examples of these trimmings, which are generally available in high volumes and at relatively low cost, include 72 pork (containing roughly 28% fat and 72% "lean", which is the portion of the 72 pork which is not fat, typically lean muscle which includes moisture). Other trimmings in this regard are 42 pork (approximately 58% fat and 42% lean), 50 beef (approximately 50% fat and 50% lean), mechanically deboned turkey (often between about 20% and 30% fat), and other sources of red meat, white meat or fowl. Generally speaking, these raw material meat sources or trimmings have a fat percent generally on the order of about 20 to about 60 weight percent. Some or all of these types of materials can be provided in ground form, a typical supply being ground to a particle size approximating one-eighth inch. Raw materials of this type are usually at a temperature on the order of 40° F.

The preferred apparatus illustrated in the drawings is a dry solids injector, generally designated as 10 in FIG. 1. This apparatus includes hopper 11 containing food treatment particulates (dry solids powder) 12. Also included is a ram assembly having a ram chamber 13, a feed ram 14 which is slidable within the chamber by operation of a pair of air cylinders 27 and 28. The ram assembly opens into a passageway 15 of a device which operates upon viscous material which flows through this passageway.

A gate assembly is positioned generally between the ram assembly and the passageway 15. This gate assembly includes a control gate 16, and an air cylinder 17. A control assembly 18 coordinates the operation of the ram assembly and of the gate assembly. Generally, ground raw meat 19 is supplied into the passageway 15. This ground raw meat 19 is injected with food treatment particulates 12. Preferably, these food treatment particulates are phosphate powder.

In order to effectively inject the meat 19 with food treatment particulates 12, these particulates must be forcibly injected into the flow of meat passing through the passageway 15. The sequencing of the feed ram 14 and the control gate 16 by the control assembly 18 provides for the implementation of the injection process of the food treatment particulates into the meat flow. The control assembly 18 can be a Programmable Logic Controller (PLC) using ladder logic diagram or PCIM software to control and sequence the operation of the feed ram 14 and the control gate 16. This control and sequencing operation is effected through timers and relay modules utilized as part of the PLC unit. Such systems are generally known, and it will be generally appreciated how they can be adapted to achieve the functions described herein.

Figure 4:
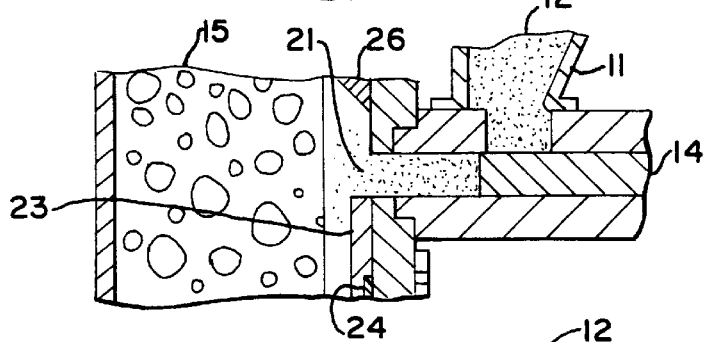
FIG. 4 is a cross-sectional detailed view of the portion of the apparatus as shown in FIG. 3, wherein the control gate is in its fully opened position with the dry solids powder being injected into the meat flow.

As shown in FIG. 1, the control gate 16 is in an initially closed position while the feed ram 14 is completely retracted in a fill position. By the feed ram 14 assuming the completely retracted position, the hopper opening 20 is unblocked, thereby permitting the entry of food treatment particulates 12 into the ram chamber 13. When the ram chamber 13 is filled with food treatment particulates 12 such as phosphate powder to a desired level, the control assembly 18 utilizing air cylinder 27 sequences the travel of the feed ram 14 toward the feed port 21 at or near a point 29 past the hopper opening 20. See FIG. 3. This desired amount is controlled by the cycling time, the diameter of the ram or feed chamber, and properties of the material being injected. It should be noted that the control gate 16 remains closed as the feed ram 14 travels toward the feed port 21 in order to avoid having back-pressure from the flow of meat 19 in the passageway 15 force meat particles into the ram chamber 13 and the hopper 11. After the feed ram 14 reaches the point 29 past the hopper opening, thereby blocking communication with the hopper 11, the control assembly 18 sequences the opening of the control gate 16. In the alternative, the blocking of the hopper opening can be effected by providing a slidable gate (not shown) near the hopper opening. The control assembly 18 further sequences the travel of the feed ram 14 toward the feed port 21 utilizing the air cylinder 28. See FIG. 4. Hence, feed ram 14 directs the food treatment particulates 12 in the direction of the passageway 15, thereby injecting the phosphate powder into the meat flow within the passageway.

Figure 5:
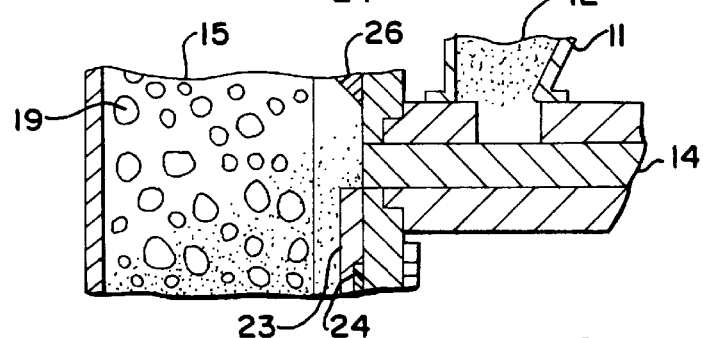
FIG. 5 is a cross-sectional detailed view of the portion of the apparatus as shown in FIG. 4, with the feed ram in the fully extended feed position.
Figure 6:
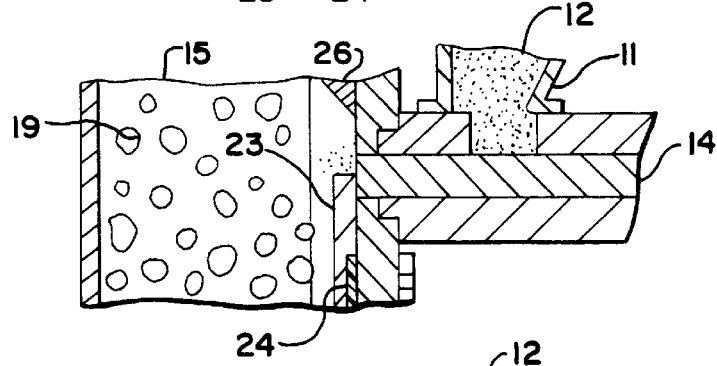
FIG. 6 is a cross-sectional detailed view of the portion of the apparatus as shown in FIG. 3, with the feed ram in the feed position and the control gate scraping the feed end of the feed ram during the closing of the control gate.

The control gate 16 remains in the opened position until all of the food treatment particulates 12 are fully injected into the meat flow. See FIG. 5. As further illustrated in FIG. 6, when the feed ram 14 reaches the extreme point of its travel, namely the feed position, then the control gate 16 is sequenced by the control assembly 18 to move toward its closed position.

It will be noted that the apparatus of the present invention includes a ledge-portion 26 placed immediately adjacent to the feed port 21 and protruding from the inside wall 25 of the passageway. The triangular shape of the ledge-portion 26 allows the phosphate powder exiting the feed port 21 to come into immediate contact with the meat 19 and to be carried away by the meat flow. This feature allows for an enhanced and efficient mixing of the phosphate powder with the meat flow.

It will be appreciated that the control gate 16 is positioned such that as it moves toward its closed position, it slidably scrapes the feed end surface 22 of the feed ram 14 clean of any meat products. This scraping action of the control gate 16 constitutes an important feature of the present invention, since it prevents the entry and accumulation of undesired matters in the ram chamber 13 that could result in the malfunction of the apparatus. For instance, ground meat or meat particles could otherwise remain attached to the feed end surface 22 of the feed ram 14 and could be carried back into the ram chamber 13 resulting, for example, in the partial or eventual complete blockage of the hopper opening 20. Also, residue meat and the like could otherwise be carried into the ram chamber 13 causing a viscous or sticky build up which will impair positive and well-timed movement of the feed ram 14.

In order to achieve the sliding action of the control gate 16 against the inside wall 25 of the passageway, the control gate assembly may be constructed to reduce sliding friction. In the illustrated embodiment, the gate assembly is made of two portions, namely a gate portion 23 and a gate-slide portion 24. The gate portion 23 is generally constructed of a rigid material such as metal which will impart needed structural integrity to the gate assembly, whereas the gate-slide portion 24 is generally constructed of a more lubricous material such as polymer having a low coefficient of friction. For example, the gate portion 23 may be stainless steel, and the gate-slide portion 24 may be made of a polytetrafluoro ethylene or Teflon (trademark) which is resistant to wear. The use of the plastic material facilitates the sliding motion of the entire control gate assembly against the inside wall 25 of the passageway and the scraping of the feed end surface 22 by the gate portion 23 of the control gate 16.

Gate-slide portion 24 extends to the edge of the feed port 21 opening when the control gate 16 is fully closed. This structural feature is very advantageous since it avoids direct contact between the gate-slide 24 lubricous polymer material and the phosphate powder, which is quite abrasive. By avoiding direct contact between the gate-slide portion 24 and the phosphate powder, the abrasion and the wear on the gate-slide 24 is greatly reduced. Moreover, by having the gate portion 23 constructed from stainless steel or the like, it is well suited for resisting the abrasiveness of the phosphate powder as the phosphate powder comes in repeated contact with the gate portion 23.

Figure 7:
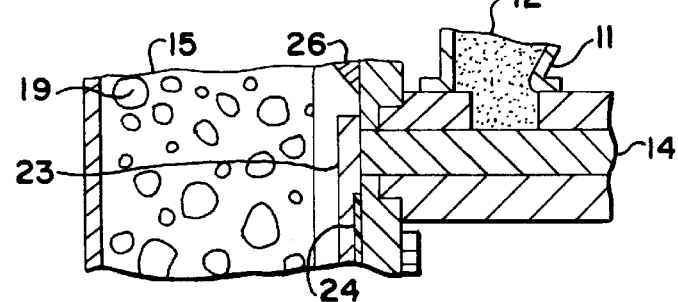
FIG. 7 is a cross-sectional detailed view of the portion of the apparatus as shown in FIG. 3, with the control gate in a fully closed position.

Upon the full closure of the control gate 16 and the scraping of the feed end surface 22 by the gate portion 23, any meat flowing through the passageway 15 will be prevented from entering the ram chamber 13, as illustrated in FIG. 7. Thereafter, the feed ram 14 retracts in the direction of travel away from the feed position to the point that it is fully retracted within the ram chamber 13 at the fill position, as shown in FIG. 1. At this point the hopper opening 20 is unblocked, thereby, allowing entry of a desired-size charge of the dry solids particulate or phosphate powder into the ram chamber 13.

It should be appreciated that when the feed ram 14 reaches its fully retracted position, a full cycle is completed and the above-described sequence may be repeated for further injection of phosphate powder into the continuous flow of meat stream. Further, it will be appreciated that the size of the ram chamber 13 and the frequency of the injection stroke provides for the control of the quantity of the dry solids injected into the meat stream.

It will be understood that the embodiments of the present invention which have been described are illustrative of some of the applications of the principles of the present invention. Various modifications may be made by those skilled in the art without departing from the true spirit and scope of the invention.

We claim:

1. An apparatus for treating flowable meat food products comprising:

a passageway for passing a flow of meat in a flowable form therethrough;

a ram chamber having a feed ram therein, wherein said feed ram is capable of being positioned in any one of a feed position and a fill position, said feed ram having a feed end;

said ram chamber having a particulate opening for entry of food treatment dry solids particulates into said ram chamber, said ram chamber having a feed port providing a path for the feeding of said food treatment dry solids particulates into the passageway;

a control gate placed generally along said passageway, wherein said control gate is capable of being positioned in any one of an open position and a closed position, said open position opening said feed port of the ram chamber and said closed position closing said feed port; and a control assembly for controlling the positional movement of said feed ram and of said control gate, said control assembly causes the food treatment dry solids particulates to enter into said ram chamber through said particulate opening as said feed ram travels toward its fill position and when said control gate is at its closed position, said control assembly directs said feed ram toward said feed port, said control assembly causes blocking of the particulate opening, and said control assembly directs said control gate to its open position, thereby opening said feed port such that said food treatment dry solids particulates are injected into the flow of meat in a flowable form through said feed port as said feed ram travels toward the feed position.

2. The apparatus of claim 1, wherein said control assembly blocking of the particulate opening fully blocks said particulate opening prior to said control assembly directing said control gate to its open position.

3. The apparatus of claim 1, wherein said feed ram fully blocks the particulate opening before said control assembly directs said control gate to its open position.

4. The apparatus of claim 1, wherein said control gate is movably mounted for effecting engagement between said control gate and the feed end of said feed ram when said feed ram is at said feed position, and said control assembly initiates said engagement and said control gate scrapes clean at least a portion of said feed end of the feed ram.

5. The apparatus of claim 1, wherein said gate remains in said closed position while said feed ram is controllably returned to said fill position.

6. The apparatus of claim 1, wherein said control gate is in the open position when said feed ram travels toward the feed position, thereby injecting said food treatment dry solids particulates into said meat passing through said passageway.

7. The apparatus of claim 1, wherein said control gate is slidably moveable.

8. The apparatus of claim 1, wherein said control gate is positioned movably in parallel relation to the longitudinal axis of said passageway.

9. The apparatus of claim 1, wherein said control gate has a leading edge, and said leading edge extends beyond the feed port when said control gate is at its closed position.

10. The apparatus of claim 1, further including a ledge portion positioned adjacent to said feed port, wherein said ledge portion has a triangular shape, thereby providing for the meat flow to carry away the food treatment dry solids particulates.

11. The apparatus of claim 1, wherein said control gate further comprises a gate portion and a gate-slide portion.

12. The apparatus of claim 11, wherein said gate portion is stainless steel.

13. The apparatus of claim 11, wherein said gate-slide portion is a lubricous polymer.

14. The apparatus of claim 11, wherein said gate-slide portion extends to an edge of the feed port when said control gate is in closed position.

15. The apparatus of claim 11, wherein said gate-slide portion is in slidable contact with a sidewall of said passageway.

16. A method of treating flowable meat food products using an apparatus including a passageway, a ram chamber having a feed ram therein, said feed ram having a feed end, said ram chamber having a particulate opening, a control gate placed within said passageway, and a control assembly for controlling the positional movement of said feed ram and said control gate, said method comprising the steps of:

flowing a stream of meat in a flowable form through the passageway;

providing food treatment dry solids particulates into said feed chamber while blocking said particulate opening;

opening said control gate;

injecting said food treatment dry solids particulates into said flowing meat supply; and closing said control gate after all of said food treatment dry solids particulates are injected into said flowing meat supply.

17. The method of claim 16, wherein the closing step further includes scraping clean said feed end of the feed ram.

18. The method of claim 16, wherein said meat in a flowable form is ground meat.

19. The method of claim 16, wherein said food treatment dry solids particulates are phosphate powder.

20. The method of claim 16, wherein said closing step further includes slidably moving the gate.

21. The method of claim 16, wherein the feed ram is capable of being positioned in either one of a feed position or a fill position, and further including the step of retracting said feed ram to said fill position after said closing step.

* * * * *